(12) United States Patent
Eckl

(10) Patent No.: US 11,706,257 B2
(45) Date of Patent: Jul. 18, 2023

(54) DEVICE AND METHOD FOR CHECKING PROPERTIES OF RESOURCES

(71) Applicant: Siemens Aktiengesellschaft, Munich (DE)

(72) Inventor: Roland Eckl, Forchheim (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/599,995

(22) Filed: Oct. 11, 2019

(65) Prior Publication Data

US 2020/0120137 A1     Apr. 16, 2020

(30) Foreign Application Priority Data

Oct. 15, 2018   (EP) .................................... 18200362

(51) Int. Cl.
   *H04L 9/40*    (2022.01)
   *G06F 21/10*   (2013.01)
   *H04L 9/06*    (2006.01)

(52) U.S. Cl.
   CPC ............ *H04L 63/20* (2013.01); *G06F 21/105* (2013.01); *H04L 9/0643* (2013.01); *H04L 63/10* (2013.01); *H04L 63/1408* (2013.01)

(58) Field of Classification Search
   CPC ....... H04L 63/20; H04L 9/0643; H04L 63/10; H04L 63/1408; G06F 21/105
   USPC ...................................................... 709/224
   See application file for complete search history.

(56) References Cited

U.S. PATENT DOCUMENTS

| | | | |
|---|---|---|---|
| 9,223,554 B1* | 12/2015 | Lawson | G06F 9/44521 |
| 2005/0021839 A1* | 1/2005 | Russell | H04L 63/0209 |
| | | | 709/238 |
| 2005/0021971 A1 | 1/2005 | Patankar et al. | |
| 2009/0031402 A1 | 1/2009 | Jung et al. | |
| 2011/0167259 A1* | 7/2011 | Fanton | G06F 21/52 |
| | | | 713/164 |
| 2012/0023579 A1 | 1/2012 | Zaitsev et al. | |
| 2016/0306978 A1* | 10/2016 | Thadikaran | G06F 12/1441 |
| 2017/0076073 A1* | 3/2017 | Abe | G06F 8/61 |

FOREIGN PATENT DOCUMENTS

| | | |
|---|---|---|
| CN | 101755271 | 6/2010 |
| CN | 102147842 | 8/2011 |

OTHER PUBLICATIONS

EP Search Report based on EP18200362 dated Apr. 26, 2019.
(Continued)

*Primary Examiner* — Kevin S Mai
(74) *Attorney, Agent, or Firm* — Cozen O'Connor

(57) ABSTRACT

Device, computer program product and method for checking properties of resources, wherein a checking device for checking properties of resources of a web server includes a calculation unit for calculating an identifier identifying a particular resource using the particular resource, a detection unit for detecting a license requirement for the particular resource using the calculated identifier, and a determination unit for determining an existing license for the web server in the case of a license requirement detected for the particular resource using the calculated identifier, such that unauthorized posting of a particular resource to a web server can be easily detected and prevented.

17 Claims, 2 Drawing Sheets

(56) References Cited

OTHER PUBLICATIONS

Office Action dated Sep. 6, 2021 issued European Patent Application No. 18 200 362.4.
Wikipedia, "Locality-Sensitive Hashing", pp. 1-6 Aug. 21, 2013.
Office Action dated Sep. 6, 2021 issued Chinese Patent Application No. 18 200 362.4.

\* cited by examiner

DEVICE AND METHOD FOR CHECKING PROPERTIES OF RESOURCES

BACKGROUND OF THE INVENTION

1. Field of the Invention

The present invention relates to a checking device, a method and a computer program product for checking properties of resources, i.e., checking properties of resources on a web server.

2. Description of the Related Art

Applications (programs) for use in a browser are becoming increasingly widespread because they can be accessed by a user using any desired devices, such as a computer, a tablet or a smartphone, independently of the operating system thereof.

In this regard, an increasing number of parts of the application are executed on the client side, i.e., directly in the browser. Reference is made here to what are known as "single-page applications" (SPA), which form a relatively large application without the user in the process having to retrieve different single pages.

One disadvantage, in this case, is that the program code of the application (program code of the program) is interpreted only at runtime and is not subject to any correct compilation step, and is furthermore executed directly at the user. The program code of the application is thus able to be copied relatively easily and made available in a comparable environment, such as on another web server.

The program code of the application cannot be compiled using machine code. As a result, simple runtime tests can be easily manipulated.

An access request to a web server for the program code of an application can thus be manipulated such that the result is always "true". This would mean that a requesting entity that manipulated the access request beforehand is allowed to access the program code of the application, even though the requesting entity is potentially barred from accessing the program code of the application.

Numerous methods are known from the prior art in order to prevent this kind of manipulation. In a first method, the application retains a significant portion of its program code in the web server, i.e., in the backend, which cannot be copied over easily. Without the correct web server (and licensing therefor), a copy of the client portion in this case remains useless.

A further method is that the data relevant for executing the application remain in the web server and are not stored on the client side. The application thus remains relatively useless if it cannot retrieve any relevant data. Without a license or permissions, the user cannot load the required data into the application or the program.

There are, however, cases in which an application itself is not intended to have any web server portion, primarily due to the resulting considerably higher complexity of the system with respect to providing the individual components and synchronizing them with one another.

One case is, for example, the use of a programmable logic controller (PLC). In this case, the program code of the application (the program) may be an add-on that requires a license, which does not belong as standard to the supplied state of the PLC and may be stored, for example, on a web server.

If the user of the PLC possesses a valid license, then he could access the program code of the application via the web server and post or download the program code of the application onto the PLC and store it locally in the memory belonging to the PLC.

In detail, this means that the user, when he has received the required authorization for the program code of the application once, even if this is temporary, can access the program code of applications that require a license, download these applications and store them elsewhere locally on the device where he then has the corresponding write permissions to be able to further use the program code of the application.

Without the presence of an additional license, the user can then easily store the downloaded program code of the application on as many further web servers of further PLCs as desired. The PLCs could thus retrieve the program code of the application via the respective further associated web servers without the user having to have a valid license for this.

SUMMARY OF THE INVENTION

In view of the foregoing, it is therefore an object of the present invention to provide a way to improve the checking of properties of resources.

This and other objects and advantages are achieved in accordance with the invention by a checking device for checking properties of resources of a web server having a calculation unit for calculating an identifier identifying a particular resource using the particular resource, a detection unit for detecting a license requirement for the particular resource using the calculated identifier, and a determination unit for determining an existing license for the web server in the case of a license requirement detected for the particular resource using the calculated identifier.

The checking device easily makes it possible to detect and to prevent unauthorized posting of a particular resource to a web server.

The checking device furthermore makes it possible to detect and to prevent unauthorized access by a client or a further web server to a particular resource on the web server.

The checking device additionally advantageously makes it possible to detect minor changes to the particular resource on the web server.

The proposed checking device makes it possible for a particular resource requiring a license to be able to be identified securely and reliably by the identifying identifier. In connection with the detection unit and the determination unit, this leads to the technical effect whereby further distribution and posting of a particular resource already downloaded from the web server to the further web server can be prevented. An attempt at unauthorized posting to the web server is additionally also able to be detected. The particular resource can thus be protected, where the particular resource is applied purely on the client side, designed for a particular environment, such as a PLC in connection with a web server, and not being able to be protected completely just via a server dependency.

The proposed checking device additionally prevents the client and/or the further web server from accessing the particular resource in the absence of a license. This increases access security for the respective resource, and therefore the security of the licensed application. The increased security therefore reduces the maintenance costs of the system, because unauthorized access can be detected and prevented more easily.

If unauthorized access to the particular resource has occurred, minor changes, such as path adjustments or uncommenting of control functions within the particular resource, can furthermore be recognized.

The respective unit, such as the calculation unit or the detection unit, may be implemented in the form of hardware and/or also in the form of software. In the case of an implementation in the form of hardware, the respective unit may be formed as a device or as part of a device, such as a computer or as a microprocessor or as a control computer of a vehicle. In the case of an implementation in the form of software, the respective unit may be designed as a computer program product, as a function, as a routine, as part of a program code or as an executable object.

A first property of the particular resource is the existence of a license requirement for the particular resource.

A second property of the particular resource is the presence of a license of the web server for the particular resource having the license requirement.

The explanations for the particular resource also apply in the same way to the resources, in particular in the following description.

In accordance with one embodiment, the particular resource comprises a file, where the file is configured as an executable file, as an information file and/or as an image file. An image file is a file in which at least one digital image is stored. The digital image is, for example, protected by copyright law.

The resource is in particular a file, preferably an executable file. An executable file, also referred to as program file, is a file that can be executed as a computer program. A computer program or a program is a series of instructions in order to process or to trigger particular functions and/or tasks using a computer. An executable file is, for example, CAD software, an operating system, a script file or the like.

In accordance with a further embodiment, the calculation unit is configured so as to calculate the identifier identifying the particular resource such that the identifying identifier is formed as a hash value.

In accordance with a further embodiment, the calculation unit is configured so as to calculate the hash value as the identifier identifying the particular resource using the particular resource.

A file (particular resource) has one or more identifying identifiers that uniquely identify the file. Such an identifier is, for example, an individual part of the file. The identifier may furthermore also be defined for various versions of the file.

A hash value constitutes a result that has been calculated via a hash function. A hash value is in particular a coded result of an uncoded particular resource. The calculation unit thus uses a hash function to calculate a hash value of the particular resource provided at the input of the hash function. This hash value is then the identifier uniquely identifying the particular resource.

The detection unit is configured so as to detect whether the file is subject to a license requirement. In this case, the detection unit compares whether the hash value (identifying identifier) is contained, for example, in a list and/or table in which files requiring licenses are listed. If the hash value of the file is listed in this list or table, the file is subject to a license requirement. If the hash value is not listed in this list and/or table, then the file is not subject to a license requirement.

The list or table is stored, for example, on the web server and/or stored on a computer having a storage unit to which the web server has access.

License requirement of a file particularly means that the user accessing the file requires a license for the file in order to execute and/or change and/or in order to access the file.

In accordance with a further embodiment, the calculation unit is configured so as to calculate the calculation of the identifier identifying the particular resource via a distance method, in which a distance between hash values of resources as calculated by the calculation unit is calculated.

Hash values are unique for a file but change even in the case of a minimal change to the file. As a result, a distance method is used.

The distance method is, for example, "locality-sensitive hashing" (LSH) or "MinHash".

The distance corresponds to a degree of similarity between two hash values of two files. The degree of similarity (distance) between two files is thus calculated in the distance method. The greater the distance between two files, the more dissimilar they are and thus the greater the difference between them. In other words, the greater the distance, the more the files differ from one another. By contrast, the lower the distance, the more similar the files are.

In accordance with a further embodiment, the checking device is configured so as to check the properties of resources of the web server at different times, where, at one time, the check occurs upon an access request and/or, at a further time, the check occurs at a defined time and/or, at a further time, the check occurs upon a device startup and/or, as a further time, the check occurs triggered by an event.

In accordance with yet a further embodiment, the checking device is configured so as to perform the check if the request to access the particular resource is made by a further web server and/or by a client.

In accordance with a further embodiment, the checking device is configured so as to perform the check if a request is made by the further web server and/or by the client to post and/or to store the particular resource on the web server. The posting is particularly defined such that the further web server and/or the client wishes to post, store and/or deposit the particular resource on the web server.

In accordance with a further embodiment, the determination unit is configured so as to trigger a first action of the web server if an existing license is determined and to trigger a second action of the web server if a non-existing license is determined.

It is also an object of the invention to provide a web server having a checking device. To this end, the web server comprises the checking device that is configured, in accordance with the disclosed embodiments of the invention.

In accordance with another embodiment, the determination unit is configured so as to trigger a first action of the web server if an existing license is determined and to trigger a second action of the web server if a non-existing license is determined, where the web server is configured so as to perform the first action, and where the first action comprises granting permission to access the particular resource, posting and/or storing the particular resource.

In accordance with a further embodiment, the web server is configured so as to perform the second action, where the second action comprises not granting permission to access the particular resource and/or deleting the particular resource, blocking the particular resource.

The distance in the above-mentioned distance method is calculated for example, via a particular threshold value. If the distance, i.e., the result of the calculation or of the comparison between two hash values of two files, falls below the particular threshold value, a license requirement exists for the particular resource. If, in addition to the distance that is dropped below, the determination unit then determines that the web server does not have a license for the particular resource, then the second action is executed by the web server. The second action may, in this case, lead to the deletion or blocking of the file or to the generation of a user warning.

The determination unit, which checks whether the file requiring a license and intended to be stored on the web server is permitted to be stored there, preferably has access to a collection of hash values (identifiers) in a list or table or the like, which provides information as to whether the web server has the required license.

The number of stored hash values (collection of hash values, identifiers) on the web server should in particular be kept as low as possible. This applies primarily with regard to the distance method, so that as few stored hash values of identifiers as possible have to be compared with the requested particular resource and checked when calculating a distance.

A few possibilities are proposed in this regard. An exclusion method may be used, for example, to compare only the identifiers that are required for the respective particular resource. Particular identifiers that are not relevant to the application are therefore not used at all for the distance method, and the computational burden is reduced.

Furthermore, only identifiers for particular resources that have a particular minimum size or particular file endings are incorporated. This reduces the number of hash values that need to be stored on a device, such as the web server. If, for example, the particular resource has a minimum size of 1 MB, identifiers that are stored for files that have only 1 KB can be excluded from the outset. The same principle applies to file endings.

A time of the check is, for example, when an access request is made. An access request may be made by the further web server or by the client. The access request may be a time in the case of a download of the particular resource by the client or the further web server.

A further time of the check is, for example, when a device is intended to be started up. Here, the check serves as a preliminary condition in order to detect whether the user can produce the license so that the device can be started up. The owner of the license otherwise refuses the device startup.

A further time of the check is, for example, when a predetermined event, such as a quality gate, occurs or any desired previous defined time is reached.

A further time of the check is, for example, a check that occurs in parallel with regular operation with minimum consumption of resources. The device startup or a predetermined time may be defined, for example, as a trigger for this check.

It is also an object of the invention to provide a system having a checking device and having a web server external to the checking device, which system is configured in accordance with the disclosed embodiments of the invention.

It is also an object of the invention to provide a method for checking properties of resources of a web server, which method comprises calculating an identifier identifying a particular resource using the particular resource, detecting a license requirement for the particular resource using the calculated identifier, and determining an existing license for the web server in the case of a license requirement detected for the particular resource using the calculated identifier.

It a further object of the invention to provide a non-transitory computer readable medium (computer program product) that prompts the performance of the method, as explained above, on a program-controlled apparatus.

A computer program product, such as a computer program means, for example, may be provided or delivered, for example, as a storage medium, such as a memory card, USB stick, CD-ROM, DVD, for example, or else in the form of a file downloadable from a server in a network. This may occur, for example, in a wireless communication network through the transmission of an appropriate file comprising the computer program product or the computer program means.

The embodiments and features described for the proposed device apply accordingly to the proposed method.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Further advantageous refinements and aspects of the invention are the subject matter of the dependent claims and of the exemplary embodiments, described below, of the invention. The invention is explained in more detail below on the basis of preferred embodiments with reference to the attached figures in which:

DETAILED DESCRIPTION OF THE
EXEMPLARY EMBODIMENTS

In the figures, identical or functionally identical elements have been provided with the same reference signs, unless indicated otherwise.

Figure 1:
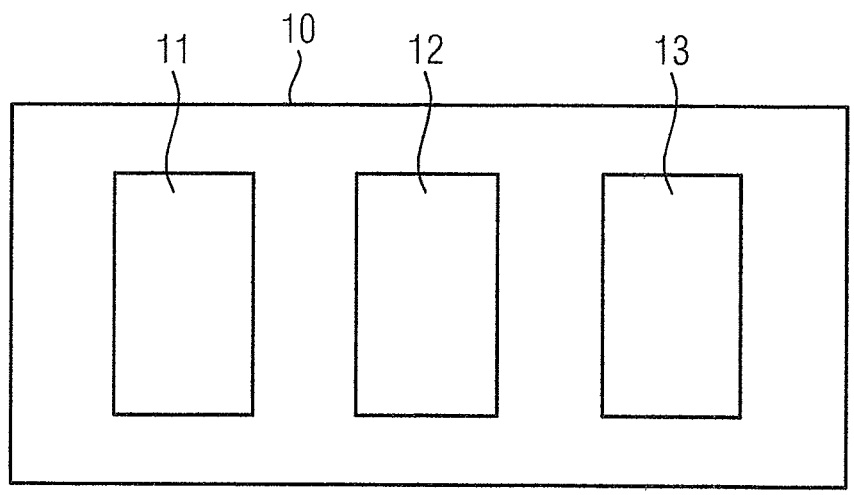
FIG. 1 shows a schematic block diagram of one exemplary embodiment of a checking device for checking properties of resources in accordance with the invention.

FIG. 1 shows a schematic block diagram of one exemplary embodiment of a checking device 10 for checking properties of resources of a web server 1.

The checking device 10 in FIG. 1 comprises a calculation unit 11, a detection unit 12 and a determination unit 13.

The calculation unit 11 is configured so as to calculate an identifier identifying a particular resource using the particular resource.

The detection unit 12 is configured so as to detect a license requirement for the particular resource using the calculated identifier.

The determination unit 13 is furthermore configured so as to determine an existing license for the web server 1 in the case of a license requirement detected for the particular resource using the calculated identifier. Here, the particular resource preferably comprises a file, where the file is configured as an executable file, as an information file and/or as an image file.

The calculation unit 11 is furthermore configured so as to calculate the identifier identifying the particular resource such that the identifying identifier is formed as a hash value.

The calculation unit 11 is furthermore configured so as to calculate the hash value as the identifier identifying the particular resource using the particular resource.

The calculation unit 11 is likewise configured so as to calculate the calculation of the identifier identifying the particular resource via a distance method, in which a distance between hash values of resources as calculated by the calculation unit 11 is calculated.

The checking device 10 is furthermore configured so as to check the properties of resources of the web server 1 at different times, where, at one time, the check occurs upon an access request and/or, at a further time, the check occurs at a defined time and/or, at a further time, the check occurs upon a device startup and/or, at a further time, the check occurs triggered by an event.

The checking device 10 is likewise configured so as to perform the check if the request to access the particular resource is made by a further web server and/or by a client.

The checking device 10 is additionally configured so as to perform the check if a request is made by the further web server and/or by the client to post and/or to store the particular resource on the web server 1.

The determination unit 13 is furthermore configured so as to trigger a first action of the web server 1 if an existing license is determined and to trigger a second action of the web server 1 if a non-existing license is determined.

Figure 2:
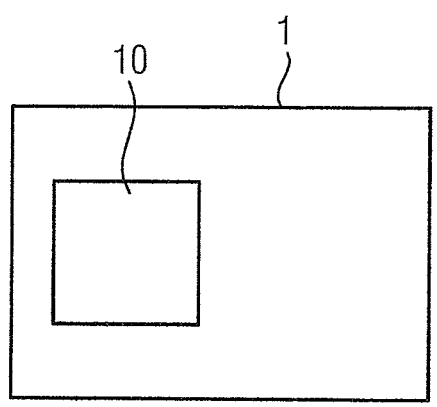
FIG. 2 shows a schematic block diagram of one exemplary embodiment of a web server having a checking device in accordance with the invention.

FIG. 2 shows a schematic block diagram of one exemplary embodiment of a web server 1 having a checking device 10. The web server 1 in this case comprises the checking device 10 from FIG. 1.

The determination unit 13 is in this case configured so as to trigger a first action of the web server 1 if an existing license is determined and to trigger a second action of the web server 1 if a non-existing license is determined, where the web server 1 is configured so as to perform the first action, and where the first action comprises granting permission to access the particular resource, posting and/or storing the particular resource.

The web server 1 is additionally configured so as to perform the second action, where the second action comprises not granting permission to access the particular resource, deleting the particular resource and/or blocking the particular resource.

Figure 3:
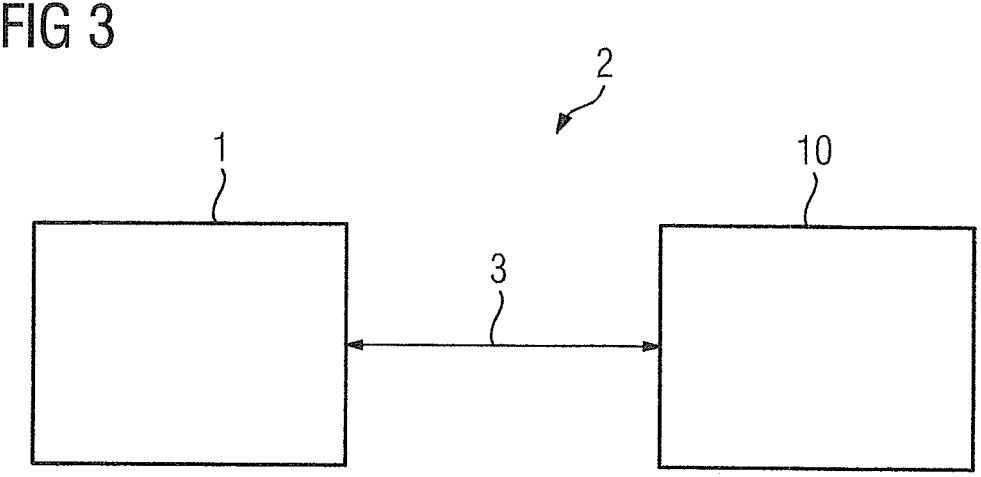
FIG. 3 shows a schematic block diagram of one exemplary embodiment of a system having a checking device and a web server in accordance with the invention.

FIG. 3 shows a schematic block diagram of one exemplary embodiment of a system 2 having a checking device 10 of FIG. 1 and a web server 1.

The system 2 comprises the web server 1, a network 3 and the checking device 10. The web server 1 and the checking device 10 are connected via the network 3. Data can be exchanged between the web server 1 and the checking device 10 via the network 3. The web server 1 of the system 2 is external to the checking device 10.

Figure 4:
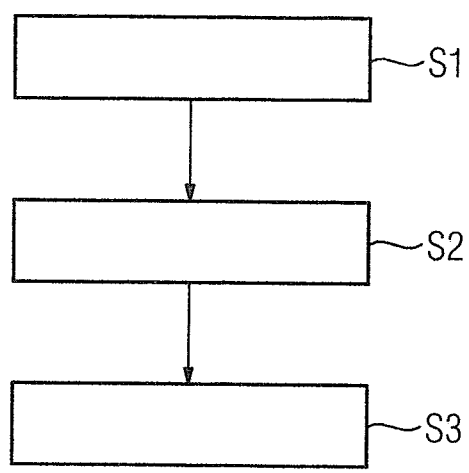
FIG. 4 shows a schematic flowchart of one exemplary embodiment of a method for checking properties of resources in accordance with the invention.

FIG. 4 shows a schematic flowchart of one exemplary embodiment of a method for checking properties of resources of a web server 1.

The exemplary embodiment of FIG. 4 comprises the method steps S1, S2 and S3.

In step S1, an identifier identifying a particular resource is calculated using the particular resource.

In step S2, a license requirement for the particular resource is detected using the calculated identifier.

In step S3, an existing license for the web server 1 in the case of a license requirement detected for the particular resource is furthermore determined using the calculated identifier.

The calculation unit 11, the detection unit 12 and the determination unit 13 from FIG. 1 are particularly configured so as to execute the method steps S1, S2 and S3 according to FIG. 4.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto

What is claimed is:

1. A checking device for checking properties of files of a web server comprising an image file, said properties of the files being checked within a programmable logic controller (PLC) to prevent unauthorized access of a client to the web server, comprising:
   a calculator for calculating an identifier identifying a particular file of the web server comprising the image file utilizing the particular file comprising the image file;
   a detector for detecting, within the PLC, a license requirement for the particular file of the web server comprising the image file utilizing the calculated identifier; and
   a license determiner for determining, within the PLC, an existing license for the web server in cases of a license requirement detected for the particular file of the web server comprising the image file utilizing the calculated identifier;
   wherein access to the web server associated with the PLC is prevented when a license requirement has been detected and the license for the web server associated with the PLC could not be determined.

2. The checking device as claimed in claim 1, wherein the file is further configured as an executable file.

3. The checking device as claimed in claim 1, wherein the calculator is configured to calculate the identifier identifying the particular file such that the identifying identifier is formed as a hash value.

4. The checking device as claimed in claim 2, wherein the calculator is configured to calculate the identifier identifying the particular file such that the identifying identifier is formed as a hash value.

5. The checking device as claimed in claim 3, wherein the calculator is configured to calculate the hash value as the identifier identifying the particular file utilizing the particular resource.

6. The checking device as claimed in claim 3, wherein the calculator is configured to perform the calculation of the identifier identifying the particular file via a distance method, in which a distance between hash values of files as calculated by the calculator is calculated.

7. The checking device as claimed in claim 5, wherein the calculator is configured to perform the calculation of the identifier identifying the particular file via a distance method, in which a distance between hash values of files as calculated by the calculator is calculated.

8. The checking device as claimed in claim 1, wherein the checker is configured to check properties of files of the web server at different times; and wherein at least one of (i) the check occurs upon an access request at one time, (ii) the check occurs at a defined time at a further time, (iii) the check occurs upon a device startup at the further time and (iv) the check occurs triggered by an event at the further time.

9. The checking device as claimed in claim 1, wherein the checker is configured to perform the check if the request to access the particular file is made by at least one of (i) a further web server and (ii) a client.

10. The checking device as claimed in claim 9, wherein the checker is configured to at least one of (i) perform the check if a request is made by at least one of (i) the further web server and the client, (ii) post the particular file on the web server and (iii) store the particular file on the web server.

11. The checking device as claimed in claim 1, wherein the license determiner is configured to trigger a first action of the web server if an existing license is determined and to trigger a second action of the web server if a non-existing license is determined.

12. A web server having the checking device as claimed in claim 1.

13. The web server as claimed in claim 12, wherein the license determiner is configured to trigger a first action of the web server if an existing license is determined and to trigger a second action of the web server if a non-existing license is determined; and wherein the web server is configured to perform the first action comprising at least one of (i) granting permission to access the particular file, (ii) posting the particular file and (iii) storing the particular file.

14. The web server as claimed in claim 13, wherein the web server is configured to perform the second action; and wherein the second action comprises at least one of (i) not granting permission to access the particular file, (ii) deleting the particular resource and (iii) blocking the particular file.

15. A system having the checking device as claimed in claim 1 and having a web server external to the checking device.

16. A method for checking properties of files of a web server comprising an image file, said properties of the files being checked within a programmable logic controller (PLC) to prevent unauthorized access of a client to the web server, the method comprising:
 calculating, within the PLC, an identifier identifying a particular file of the web server comprising the image file utilizing the particular file comprising the image file;
 detecting, within the PLC, a license requirement for the particular file of the web server comprising the image file utilizing the calculated identifier;
 determining, within the PLC, an existing license for the web server within the PLC in cases of a license requirement detected for the particular file of the web server comprising the image file utilizing the calculated identifier; and
 preventing access to the web server associated with the PLC when a license requirement has been detected and the license for the web server associated with the PLC could not be determined.

17. A non-transitory computer-readable medium encoded with a computer program having program code instructions which, when executed by a programmable logic controller (PLC), causes checking of properties of files of a web server comprising an image file, said properties of the file being checked within the PLC to prevent unauthorized access of a client to the web server, the computer program comprising:
 program code for calculating, within the PLC, an identifier identifying a particular file of the web server comprising the image file utilizing the particular file comprising the image file;
 program code for detecting, within the PLC, a license requirement for the particular file of the web server comprising the image file utilizing the calculated identifier;
 program code for determining, within the PLC, an existing license for the web server within the PLC in the case of a license requirement detected for the particular file of the web server comprising the image file utilizing the calculated identifier; and
 program code for preventing access to the web server associated with the PLC when a license requirement has been detected and the license for the web server PLC could not be determined.

* * * * *